April 19, 1966      G. A. DAWE      3,246,952
TITRATING AND RECORDING APPARATUS
Filed Aug. 13, 1962
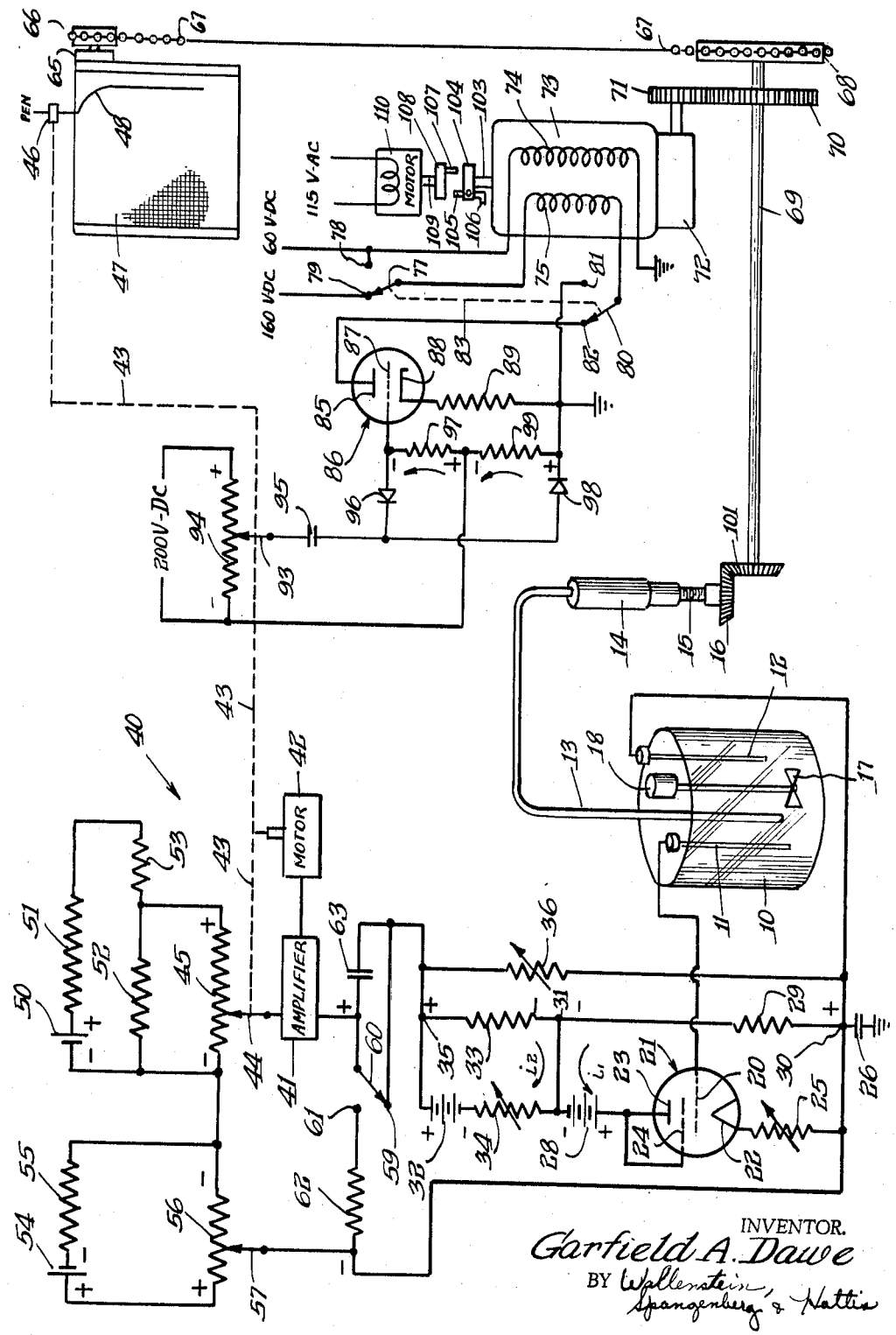
INVENTOR.
Garfield A. Dawe
BY Wallenstein,
Spangenberg & Hattis
attys.

United States Patent Office 3,246,952
Patented Apr. 19, 1966

3,246,952
TITRATING AND RECORDING APPARATUS
Garfield A. Dawe, Northbrook, Ill., assignor to E. H. Sargent & Co., Chicago, Ill., a corporation of Illinois
Filed Aug. 13, 1962, Ser. No. 216,450
15 Claims. (Cl. 23—253)

The principal object of this invention is to provide a titrating and recording apparatus wherein the titration is automatically and accurately performed and wherein the amount of standard solution added and the completion of the titration reaction are accurately recorded.

In titrating procedures, a known amount of solution to be titrated is contained in a cell, a standard solution is continuously added thereto through the completion of the reaction, and the completion of the reaction is noted. By determining the amount of standard solution added to complete the reaction, the concentration of the solution titrated may be calculated. Here, a cell is utilized which produces voltages in accordance with the condition of the solution being titrated, and the completion of the reaction is indicated by the voltage conditions in the cell, the cell producing a maximum rate of voltage change at the point of complete reaction (the inflection point).

However, the reaction rate of the constituents in the cell is usually quite slow, a certain length of time being required to react the standard solution with the solution being titrated and change the voltage produced by the cell, and this poses a considerable problem. If the standard solution is added to the cell rapidly, there is a considerable lag in voltage change and a corresponding time error at the complete reaction or inflection point, resulting in substantial error in the titration procedure. If, on the other hand, the standard solution is added slowly to eliminate such error, the titration may require undue lengths of time (20 or 30 minutes or more) for completion and this, of course, is usually intolerable. This problem becomes particularly aggravated where the nature of the solution to be titrated is not clearly known.

In accordance with the instant invention, the titration is started at a rapid rate and then automatically slowed down to a slow rate while going through the critical complete reaction or inflection point, thereby providing accurate titration in minimal time. For example, in accordance with this invention, the titration may be started by adding standard solution at the rate of 7 or 8 ml. per minute, and when the titration approaches the complete reaction or inflection point, the rate of addition of the standard solution is automatically and progressively slowed down to a third of an ml. per minute while going through the critical complete reaction or inflection point. The complete titration may be accurately accomplished in a matter of but a relatively few minutes. The voltages produced by the cell accurately represent the condition of the solution being titrated, particularly at the critical complete reaction or inflection area, and they, as well as the amount of standard solution added, are accurately and rapidly recorded on a chart.

Briefly, the titrating and recording apparatus of this invention includes a cell for containing a solution to be titrated by the continuous addition of a standard solution thereto through the completion of the reaction wherein the reaction and changing of the condition of the solution involves a time lag. The cell produces a voltage in accordance with the condition of the solution, it producing a maximum rate of voltage change at the point of complete reaction. It also includes a burette for continuously adding a standard solution to the cell for changing the condition of the solution in the cell. It further utilizes a measuring and recording apparatus including measuring means responsive to the voltage values produced by the cell, an advancing chart graduated with respect to the cell solution conditions and the advancing movement of the chart, and recording means controlled by the measuring means for recording on the chart the voltage conditions and hence the conditions of the solution in the cell.

In addition, the titrating and recording apparatus of this invention includes motor means for advancing the chart and operating the burette in timed relation so that the chart also records the amount of standard solution added by the burette. It further includes means responsive to the rate of change of the voltage produced by the cell, regardless of the direction of the change, and hence to the rate of change of the condition of the solution in the cell for controlling the motor to slow down the advacing movement of the chart and the rate of addition of the standard solution to the solution in the cell adjacent the complete reaction or inflection point to accurately record the amount of standard solution added and the voltage change produced by the cell at the completion of the reaction.

Preferably, the measuring means is a null-point measuring means including means responsive to the voltage produced by the cell and also rebalancing means movable in accordance with such voltage conditions, the recording means being operated by the rebalancing means. Also, the means for controlling the speed of the motor means for the chart and the burette is preferably controlled by the rebalancing means in response to the first derivative of the speed of movement of the rebalancing means which corresponds to and is determined by the rate of change of the condition of the solution in the cell.

The null-point measuring means may also include means responsive to the rate of change of the voltage conditions in the cell for recording such rates of change on the chart in lieu of the actual voltage conditions, thereby providing in one apparatus two types of measuring and recording. When this latter responsive means is utilized, the motor means for the chart and burette is preferably operated at a substantially constant speed.

Further objects of this invention reside in the details of construction of the titrating and recording apparatus and in the cooperative relationships between the component parts thereof.

Other objects and advantages of this invention will become apparent to those skilled in the art upon reference to the accompanying specification, claims and drawing, in which the titrating and recording apparatus of this invention is diagrammatically illustrated.

A conventional titrating cell 10 is utilized for containing a known quantity of a solution to be titrated and reacted, and it includes a pair of electrodes 11 and 12, which, for example, for pH measurement purposes, may be typical glass-calomel electrodes. A standard solution is admitted to the solution being reacted by a burette tube 13 arranged between the electrodes 11 and 12, the standard solution being added by means of a piston type burette 14 wherein the piston may be operated by a screw 15 driven by a gear 16. A paddle wheel 17 is arranged in the bottom of the cell 10 and is driven by a suitable motor 18 for agitating the solution in the cell to make the same uniform throughout. The cell 10 produces voltages across the electrodes 11 and 12 in accordance with the condition of the solution between the electrodes.

The electrode 11 is suitably connected to a control grid 20 of a vacuum tube 21, such as a 5886 tube, having a cathode 22, a plate 23 and a screen grid 24 connected to the plate 23. The cathode 22 is connected through resistance means including a variable resistance 25 to point 30 in the electrical network and then through a condenser 26 to ground. Point 30 is also connected to the electrode 12 in the cell 10. Voltage is applied to the plate circuit of the tube 21 by a battery 28 having its positive side connected to the plate 23 of the tube 21 and its negative side connected through point 31 and resistance 29 to the point 30. As a result, plate current flows in the plate circuit in the direction indicated by the arrow $i_1$ and produces a voltage drop across the resistance 29 and a voltage difference between the points 30 and 31 as indicated.

The electrical network also includes an intercept circuit including a battery 32 having its positive side connected to point 35 and having its negative side connected through resistance means including a variable resistance 34 to point 31, a resistance 33 being connected between points 31 and 35. Thus, the intercept circuit produces a current flow in the direction indicated by the arrow $i_2$ to produce a voltage drop across the resistance 33 and a voltage difference between the points 31 and 35 as indicated. The two resistances 29 and 33 are connected in series between the points 30 and 35 and a resistance means including a variable resistance 36 is also connected to the points 30 and 35 in parallel to the series connected resistances 29 and 33. The points 30 and 35 of the electrical network form input points for the measuring and recording apparatus to be described hereafter.

In the case of measuring the pH of the solution in the cell 10, when the pH is 7, the electrode voltage appearing at the grid 20 of the tube 21 is zero and, as the pH decreases below 7, positive voltages are produced at the grid 20 in accordance with the amount of decrease and, when the pH increases above 7, negative voltages are produced at the grid 20 in accordance with the amount of increase. Thus, the cell 10 operates to control the tube 21 to vary uniformly the current flow $i_1$ in the plate circuit and vary the voltage across the resistance 29 in the plate circuit. The current $i_2$ in the intercept circuit determines the voltage across the resistance 33 and the current is adjusted to maintain a predetermined voltage drop across the resistance 33 which is of opposite polarity to the voltage drop across the resistance 29 in the plate circuit. These voltages across these series connected resistances 29 and 33 produce voltages across the points 30 and 35, which are the algebraic sum of the separate voltages, and the voltages across the points 30 and 35 are applied to the input of the measuring and recording apparatus.

As a typical example, when the solution in the cell 10 has a pH of zero, and a set of typical glass-calomel electrodes are utilized, the voltage across the electrodes 11 and 12 is approximately +.420 volts, and this voltage applied to the grid 20 of the tube 21 produces a plate current $i_1$ of —108 micro amperes for this particular 5886 tube. Here, the intercept control resistance 34 is adjusted until the voltage across the points 30 and 35 is zero, and this occurs when the intercept current $i_2$ is adjusted to a value of +108 micro amperes. As a result, the voltage across the resistance 29 in the plate circuit is —10.8 volts and the voltage across the resistance 33 is +10.8 volts to provide zero voltage across the points 30 and 35. When the pH of the solution in the cell 10 is 4, the electrode voltage at the grid 20 is +.180 volts, the plate current $i_1$ is —105.6 micro amperes, and the voltage across the resistance 29 is —10.56 volts. Since the intercept current $i_2$ remains fixed at +108 micro amperes and the voltage across the resistance 33 remains fixed at +10.8 volts, the voltage across the points 30 and 35 is the algebraic sum of +.24 volts. Again, when the pH of the solution in the cell 10 is 7, the electrode voltage applied to the grid 20 of the tube 21 is zero, the plate current $i_1$ is —103.8 micro amperes and the voltage across the resistance 29 is —10.38 volts. Since the intercept current $i_2$ remains constant at +108 micro amperes and the voltage across the resistance 33 remains constant at +10.8 volts, the voltage across the points 30 and 35 is the algebraic sum of +.42 volts. Still again, when the pH of the solution in the cell 10 is 10, the electrode voltage applied to the grid 20 of the tube 21 is —.180 volts and the tube plate current $i_1$ is —102.0 micro amperes to produce a voltage across the resistance 29 of —10.2 volts. Since the intercept current $i_2$ remains constant at +108 micro amperes and the voltage across the resistance remains constant at +10.8 volts, the voltage across the points 30 and 35 is the algebraic sum of +.60 volts.

Thus, for example, as the pH of the solution in the cell 10 varies from zero to 10 pH, there is a corresponding voltage variation applied to the grid 20 of the tube 21 which reverses its polarity at 7 pH to provide a uniform decrease in the tube plate current $i_1$ and a uniform decrease in voltage across the resistance 29. When this uniform decrease in voltage across the resistance 29 is algebraically added to the substantially constant voltage across the resistance 33, the voltage applied to the measuring and recording apparatus by the points 30 and 35 uniformly increases. In order to obtain uniform linear variations, the gain of the network is adjusted by means of the variable resistance 36 which operates as a slope control. This slope control takes care of any variations in gain for different tubes 21 and once the adjustment is made, only infrequent adjustments may be required thereafter.

The measuring and recording apparatus is generally designated at 40 and it may be of the type disclosed in Dawe et al. Patent No. 2,931,964. Briefly, it includes an amplifier 41 which is controlled by a self-balancing potentiometer network responsive to the voltage across the points 30 and 35 for operating a reversible electric motor 42. The reversible motor 42 operates, through a suitable mechanical coupling 43, a contact 44 of a potentiometer rebalancing slide wire 45 and a pen 46 cooperating with a graduated chart 47 for recording the voltage conditions at the points 30 and 35 on the chart, as indicated at 48. Assuming the example discussed above, the recorder range from zero pH to 10 pH provides a voltage range from zero to .600 volts full scale and if the chart is calibrated in 100 divisions thereacross, zero pH and zero volts gives a recorder reading of zero, 4 pH and .24 volts gives a recorder reading of 40 divisions, 7 pH and .42 volts gives a recorder reading of 70 divisions, and 10 pH and .60 volts gives a recorder reading of 100 divisions. Thus, the actual pH conditions in the cell are accurately and uniformly recorded on the chart 47 in reference to the graduations thereacross.

Voltage is supplied to the rebalancing slide wire 45 by a battery 50, the negative side of the battery 50 being connected to the negative side of the slide wire and the positive side of the battery 50 being connected through the resistance 51 and 53 to the positive side of the slide wire 45. A resistance 52 is also connected in parallel with the slide wire 45. The resistance 51 includes the calibrating resistance for the slide wire 45 and the resistances 52 and 53 are range adjustment resistances which are appropriately selected for directly recording the pH of the solution in the cell 10 in pH terms on the chart 47. The potentiometer network also preferably includes an additional battery 54 for shifting the pen of the recorder so as to provide desired initial position of the pen. The positive side of the battery 54 is connected to the plus side of the resistance 56 and the minus side of the battery is connected through a resistance 55 to the minus side of the resistance 56. A manually adjustable contact 57 is positioned along the resistance 56 to provide the initial setting. The resistance 55 is suitably selected so that the dial for the contact 57 reads rationally either in pH or in millivolts.

The point 35 is connected to a contact 59 which in turn is connected by a switch arm 60 to the input of the amplifier, the switch arm 60 also cooperating with a contact 61 which is connected through a resistance 62 to the contact 57 of the resistance 56 and to the point 30. The negative side of the resistance 56 is connected to the negative side of the potentiometer rebalancing slide wire 45, the slider 44 of which is also connected to the input of the amplifier 41. The point 35 is also connected through a condenser 63 to the input of the amplifier but, with the switch arm 60 in the position illustrated, this condenser 63 is shunted and the resistance 62 is rendered inoperative.

With the switch arm 60 in the position illustrated, the amplifier 41 responds to the difference in voltage between the point 35 and the slide wire contact 44 and operates the reversible electric motor 42 in a direction and at a speed dependent upon the direction and extent of the unbalance of the voltage existing at the point 35 and the slide wire contact 44. Operation of the reversible motor 42 drives the pen 46 and the slide wire contact 44 in the appropriate direction to rebalance the voltages at the points 35 and 44. When balanced voltages appear, the reversible motor 42 stops and, in this way, the self-balancing potentiometer network is automatically rebalanced and the pH or voltage conditions are automatically recorded on the chart 47 by the pen 46.

The chart 47 is driven by a chart roll 65 which is connected to a sprocket wheel 66 which, in turn, is driven by a chain 67 from a sprocket wheel 68 carried by a shaft 69. The shaft 69 is rotated by a pair of meshing gears 70 and 71 driven by a gear reducer 72 operated by a variable speed D.C. motor 73 having a field winding 74 and an armature winding 75. Thus, as the motor 73 is operated, the shaft 69 is rotated and the chart 47 is correspondingly advanced. The chart 47 is provided with uniform graduations throughout its length, indicating the chart position with respect to the pen 46. A voltage source, such as a 60 volt D.C. source, is connected to one end of the field winding 74, the other end of which is connected to ground, the 60 volt D.C. source energizing the field winding when the source is activated. One end of the armature winding 75 is connected to a switch arm 77 adapted alternately to engage contacts 78 or 79 and the other end of the armature winding 75 is connected to a switch arm 80 adapted alternately to engage contacts 81 or 82. The switch arms 77 and 80 are mechanically coupled, as indicated at 83, when they are moved into engagement with the contacts 78 and 81, a circuit is completed from the 60 volt D.C. source through contact 78, switch arm 77, armature winding 75, switch arm 80 and contact 81 to ground. With both the field winding 74 and the armature winding 75 connected to the 60 volt D.C. source, the variable speed motor 73 is driven at a constant speed for rotating the shaft 69 and advancing the chart 47 at a constant speed.

The electric motor 73 may also be operated at a controlled variable speed. In this connection, another voltage source, such as a 160 volt D.C. source, is connected to the contact 79 so that when the switch arm 77 is moved into engagement with the contact 79, the armature winding 75 is connected to the 160 volt D.C. source. At the same time the switch arm 80 engages the contact 81 so as to connect the other end of the armature winding 75 to a plate 85 of a vacuum tube 86, such as a 6AG7 tube, having a control grid 87 and a cathode 88. The cathode 88 is connected to ground through a resistance 89. Thus, when the switch arms 77 and 80 are in the position shown, a circuit is completed from the 160 volt D.C. source through the contact 79, the switch arm 77, the armature winding 75, the switch arm 80, the contact 82, the plate 85, the cathode 88, and the resistance 89 to ground. When the signal voltage on the grid 87 of the tube 86 is substantially zero, maximum plate current flows through the tube 86 to provide maximum energization of the armature winding 75 to operate the variable speed motor 73 at maximum speed.

The speed of the variable speed motor 73 is decreased, upon operation of the reversible motor 42 and movement of the pen 46, under the control of the tube 86 by the grid 87. The grid of the tube 86 is controlled in accordance with the first derivative of the speed of the motor 42 and the pen 46 and, hence, in accordance with the rate of change of the condition of the solution in the cell 10. Towards this end, a voltage source, such as, a 200 volt D.C. voltage source, is applied across a slide wire 94 having a movable contact 93 which is mechanically coupled to the reversible motor 42 and the pen 46 as indicated at 43. The movable contact 93 is connected to one side of a condenser 95 and the other side thereof is connected through a rectifier 96 to the control grid 87 of the tube 86 and to one end of a resistance 97. The condenser 95 is also connected through a rectifier 98 to ground and also to one end of a resistance 99. The other ends of the resistances 97 and 99 are connected together and to one end of the slide wire resistance 94. When the movable contact 93 is stationary, there is no charging or discharging of the condenser 95 and, hence, no current flow through the resistances 97 and 99. Under this condition, the signal voltage on the control grid 87 of the tube 86 is substantially zero to allow maximum current flow through the armature winding 75 to provide maximum speed of operation of the motor 73. When, however, the movable contact 93 is moved in one direction or the other by the reversible motor 42, the condenser 95 is charged or discharged and the signal voltage on the control grid 87 is decreased below zero to decrease the current flow through the armature winding 75 and, hence, decrease the speed of operation of the motor 73. This reduction in speed is dependent upon the amount of decrease in the signal voltage on the control grid 87 of the tube 86, and, hence upon the rate of change of movement of the movable contact 93 with respect to the slide wire resistance 94 and, as expressed above, this decrease in motor speed is independent of the direction of movement of the movable contact 93.

In this respect, assuming that the contact 93 is moving towards the negative side of the resistance 94, the condenser 95 is being discharged to create a current flow through the resistance 97 and the rectifier 96 in the direction indicated by the arrow to cause the control grid 87 of the tube 86 to go negative and, hence, decrease the current flow through the tube 86, the amount of decrease in current flow being dependent upon the rate of change of movement of the movable contact 93. In this way, the speed of the motor 73 is decreased upon movement of the movable contact 93 towards the negative side of the slide wire resistances 94 in accordance with the rate of change of movement of the contact 93 and, hence, the rate of change of the condition of the solution in the cell 10. When the movable contact 93 is being moved toward the positive side of the slide wire resistance 94, the condenser 95 is being charged to cause a current flow through the rectifier 98 and the resistance 99 in the direction indicated by the arrow. Since no current flow is passing through the resistance 97, the minus side of the resistance 99 is directly coupled to the control grid 87 through the resistance 97 to drive the control grid 97 negative in an amount dependent upon the rate of change of movement of the movable contact 93 towards the positive side of the slide wire resistance 94. As a result, the speed of the reversible motor 73 is also decreased by this movement and in an amount corresponding to the first derivative of the speed of movement of the contact 93 and, hence, in accordance with the rate of change in the condition of the solution in the cell 10. Thus, the network, including the condenser 95, the rectifiers 96 and 98 and the resistances 97 and 99, operates to slow down the speed of the motor 73 in accordance with the first derivative of the speed of movement of the movable contact 93 regardless of the direction of movement thereof. Accordingly, the speed of movement of the reversible motor 73 is controlled in accordance with the rate of change of the condition of the solution in the cell 10 in either direction.

The shaft 69, which is operated by the variable speed motor 73, is connected by a gear 101 to the gear 16 for also controlling the speed of operation of the burette 14 in accordance with the first derivative of the speed of movement of the reversible motor 42 and the pen 46 and, hence, in accordance with the rate of change of the condition in the cell 10. Accordingly, as the condition of the solution in the cell 10 changes, the rate of addition of the standard solution thereto by the burette 14 is changed in accordance with the rate of change of the condition of the solution in the cell 10.

Since the shaft 69 drives both the burette 14 and the graduated chart 47, the chart 47 in conjunction with its position graduations and the pen 46 directly records the amount of standard solution added to the solution in the cell 10. Thus, the pen 46, in addition to recording the condition of the solution in the cell 10 transversely of the chart, also records the amount of standard solution added to the cell longitudinally of the chart to provide a complete record of the titration proceeding.

As an example, in a typical titration procedure, the voltage at the electrodes 11 and 12 of the cell 10 at first changes very little and, consequently, the pen 46 moves slowly across the chart 47, and the D.C. motor 73 operates at substantially its maximum speed to add the standard solution rapidly to the cell 10. As the complete reaction or inflection point is approached, the voltage at the electrodes 11 and 12 begins to change more rapidly and the reversible motor 42 and the pen 46 begin to move rapidly and, as a result, the rate of delivery of the standard solution to the cell 10 is automatically reduced. This is important because of the reaction rate of the constituents in the cell 10, a certain length of time being required to react the standard solution with the solution being titrated and to change the voltage being produced by the cell. For example, with the titration and recording apparatus of this invention, the titration may be started by delivering 7 or 8 ml. per minute of the standard solution to the cell and it will automatically slow itself down to a point wherein a third of a ml. per minute of standard solution is being added while approaching and going through the critical reaction or inflection point. In this way, accurate titration is afforded in a minimum of time and the titration procedure is accurately recorded on the graduated chart 47.

To insure positive operation of the motor 73 and, hence, operation of the burette 14 and advancing of the chart 47 at slow speeds, the shaft 103 of the motor 73 is provided with a collar 104 having a centrifugal overriding clutch member 105 controlled by a centrifugal weight 106. When the motor 73 is operating at a reltaively high speed, the weight 106 swings outwardly to depress the clutch member 105. When, however, the motor is operated at a relatively slow speed, the weight 106 falls downwardly to raise the clutch member 105 to the position illustrated in the drawing. The clutch member 105, in this position, is adapted to be engaged by a clutch member 107 on a collar 108 carried by a shaft 109 of a constant speed motor 110 powered by a suitable voltage source, such as a 115 volt A.C. source. The motor 110, operating in conjunction with the clutch members 107 and 105, operates to drive the shaft 69 at a constant slow speed to supply, for example, a third of a ml. per minute of standard solution to the cell 10, thereby assuring this minimum rate of addition of the standard solution. When, however, the motor 73 is operating above a minimum speed, as for example, for adding the standard solution at a rate of more than one-third of a ml. per minute, the clutch between the motor 73 and the motor 110 automatically disengages so that more rapid rates of addition of the standard solution are provided by the variable speed motor 73.

In some instances, it may be desirable to record on the graduated chart 47 the rate of change of the condition of the solution in the cell 10 rather than the actual condition thereof. The titration and recording apparatus of this invention provides for such a recording. In this connection, the switch arm 60 is moved into engagement with the contact 61, thereby effectively connecting the condenser 63 between the point 35 and the input of the amplifier 41 and connecting the input of the amplifier through the resistance 62 to the point 30 of the network. By reason of this connection of the condenser 63 and the resistance 62 into the network, the amplifier 41 responds to the rate of change of the condition of the solution in the cell 10 and this rate of change is recorded on the graduated chart 47. When such a measurement and recording in accordance with the rate of change of the condition of the solution in the cell 10 is utilized, it is preferable to drive the burette 14 and to advance the chart 47 at a constant speed. To do this, the switch arms 77 and 80 are moved into engagement with the contacts 78 and 81 to interrupt the control of the motor 73 by the tube 86 and to operate the same at a substantially constant speed.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A titrating and recording apparatus comprising, a cell for containing a solution and producing a voltage of values corresponding to the condition of the solution, a burette for continuously adding a standard solution to the cell for changing the condition of the solution in the cell, measuring and recording apparatus including measuring means responsive to the rate of change of the voltage produced by the cell, an advancing chart graduated with respect to the cell solution conditions and the advancing movement of the chart, and recording means controlled by the measuring means for recording on the chart the rate of change of the voltage and hence the rate of change of the condition of the solution in the cell, and motor means for advancing the chart and operating the burette in timed relation so that the chart also records the amount of standard solution added by the burette.

2. A titrating and recording apparatus comprising, a cell for containing a solution and producing a voltage of values corresponding to the condition of the solution, a burette for continuously adding a standard solution to the cell for changing the condition of the solution in the cell, measuring and recording apparatus including measuring means having first means responsive to the voltage values produced by the cell and second means responsive to the rate of change of the voltage produce by the cell, an advancing chart graduated with respect to cell solution conditions and the advancing movement of the chart, recording means for the chart controlled by the measuring means, means rendering the first responsive means of the measuring means operative for recording on the chart the voltage values and hence the conditions of the solution in the cell, means rendering the second responsive means of the measuring means operative for recording on the chart the rate of change and hence the rate of change of the condition of the solution in the cell, and motor means for advancing the chart and operating the burette in time relation so that the chart also records the amount of standard solution added by the burette.

3. A titrating and recording apparatus comprising a cell for containing a solution to be titrated by the continuous addition of a standard solution thereto until the reaction is completed wherein the reaction and changing of the condition of the solution involves a time lag, the cell producing a voltage in accordance with the condition of the solution, a burette for continuously adding a standard solution to the cell for changing the condition of the solution in the cell, measuring and recording apparatus including measuring means controlled by the voltage produced by the cell, and advancing chart graduated with respect to cell solution conditions and the advancing movement of the chart, and recording means controlled by the measuring means for recording on the chart the cell solution conditions, and motor means for advancing the chart and operating the burette in timed relation so that the chart also records the amount of standard solution added by the burette, and means responsive to the rate of change of the voltage produced by the cell and hence the rate of change of the condition of the solution in the cell for controlling the motor means to slow down the advancing movement of the chart and the rate of addition of the standard solution to the solution in the cell as the rate of change of the condition of the solution in the cell increases to accurately record the cell solution conditions at the completion of the reaction.

4. A titrating and recording apparatus comprising, a cell for containing a solution to be titrated by the continuous addition of a standard solution thereto until the reaction is completed wherein the reaction and changing of the condition of the solution involves a time lag, the cell producing a voltage of values corresponding to the condition of the solution, a burette for continuously adding a standard solution to the cell for changing the condition of the solution in the cell, measuring and recording apparatus including measuring means responsive to the voltage values produced by the cell, an advancing chart graduated with respect to the cell solution conditions and the advancing movement of the chart, and recording means controlled by the measuring means for recording on the chart the voltage values and hence the conditions of the solution in the cell, and motor means for advancing the chart and operating the burette in timed relation so that the chart also records the amount of standard solution added by the burette, and means responsive to the rate of change of the voltage produced by the cell and hence the rate of change of the condition of the solution in the cell for controlling the motor means to slow down the advancing movement of the chart and the rate of addition of the standard solution to the solution in the cell as the rate of change of the condition of the solution in the cell increases to accurately record the cell solution conditions at the completion of the reaction.

5. A titrating and recording apparatus comprising, a cell for containing a solution to be titrated by the continuous addition of a standard solution thereto until the reaction is completed wherein the reaction and changing of the condition of the solution involves a time leg, the cell producing a voltage of values corresponding to the condition of the solution, a burette for continuously adding a standard solution to the cell for changing the condition of the solution in the cell, measuring and recording apparatus including measuring means having first means responsive to the voltage values produced by the cell and second means responsive to the rate of change of the voltage produced by the cell, an advancing chart graduated with respect to cell solution conditions and the advancing movement of the chart, recording means for the chart controlled by the measuring means, means rendering the first responsive means of the measuring means operative for recording on the chart the voltage values and hence the conditions of the solution in the cell, means rendering the second responsive means of the measuring means operative for recording on the chart the rate of change and hence the rate of change of the condition of the solution in the cell, and motor means for advancing the chart and operating the burette in timed relation so that the chart also records the amount of standard solution added by the burette, and means responsive to the rate of change of the voltage produced by the cell and hence the rate of change of the condition of the solution in the cell for controlling the motor means to slow down the advancing movement of the chart and the rate of addition of the standard solution to the solution in the cell as the rate of change of the condition of the solution in the cell increases to accurately record the cell solution conditions at the completion of the reaction, means for rendering said last mentioned means operative when the first responsive means of the measuring means is rendered operative, and means for operating the motor means at a substantially constant speed when the second responsive means of the measuring means is rendered operative.

6. A titrating and recording apparatus comprising, a cell for containing a solution to be titrated by the continuous addition of a standard solution thereto through the completion of the reaction wherein the reaction and changing of the condition of the solution involves a time lag, the cell producing a maximum rate of voltage change at the point of complete reaction, a burette for continuously adding a standard solution to the cell for changing the condition of the solution in the cell to produce a maximum rate of voltage change by the cell upon completion of the reaction, measuring and recording apparatus including measuring means responsive to the voltage values produced by the cell, an advancing chart graduated with respect to the cell solution conditions and the advancing movement of the chart, and recording means controlled by the measuring means for recording on the chart the voltage conditions and hence the conditions of the solution in the cell, motor means for advancing the chart and operating the burette in timed relation, and means responsive to the rate of change of the voltage produced by the cell, regardless of the direction of the change, and hence to the rate of change of the condition of the solution in the cell for controlling the motor means to slow down the advancing movement of the chart and the rate of addition of the standard solution to the solution in the cell adjacent the point of complete reaction to accurately record the amount of standard solution added and the voltage change produced by the cell at the completion of the reaction.

7. A titrating and recording apparatus comprising, a cell for containing a solution to be titrated by the continuous addition of a standard solution thereto until the reaction is completed wherein the reaction and changing of the condition of the solution involves a time lag, the cell producing a voltage of values corresponding to the condition of the solution, a burette for continuously adding a standard solution to the cell for changing the condition of the solution in the cell, measuring and recording apparatus including null-point measuring means responsive to the voltage values produced by the cell and having rebalancing means movable in accordance with said voltage values, an advancing chart graduated with respect to the cell solution conditions and the advancing movement of the chart, and recording means operated by the movable rebalancing means of the measuring means for recording on the chart the voltage values and hence the condition of the solution in the cell, motor means for advancing the chart and operating the burette in timed relation, and means responsive to the first derivative of the speed of movement of the rebalancing means and hence to the rate of change of the condition of the solution in the cell for controlling the motor means to slow down the advancing movement of the chart and the rate of addition of the standard solution to the solution in the cell as the rate of change of the condition of the solution in the cell increases to accurately record the amount of standard solution added and the completion of the reaction.

8. A titrating and recording apparatus comprising, a cell for containing a solution to be titrated by the continuous addition of a standard solution thereto through the completion of the reaction wherein the reaction and changing of the condition of the solution involves a time lag, the cell producing a maximum rate of voltage change at the point of complete reaction, a burette for continuously adding a standard solution to the cell for changing the condition of the solution in the cell to produce a maximum rate of voltage change by the cell upon completion of the reaction, measuring and recording apparatus including null-point measuring means responsive to the voltage values produced by the cell and having rebalancing means movable in accordance therewith, an advancing chart graduated with respect to the cell solution conditions and the advancing movement of the chart, and recording means operated by the movable rebalancing means of the measuring means for recording on the chart the voltage conditions and hence the conditions of the solution in the cell, motor means for advancing the chart and operating the burette in timed relation, and means responsive to the first derivative of the speed of movement of the rebalancing means, regardless of the direction of such movement, and hence to the rate of change of the condition of the solution in the cell for controlling the motor means to slow down the advancing movement of the chart and the rate of addition of the standard solution to the solution in the cell adjacent the point of complete reaction to accurately record the amount of standard solution added and the voltage change produced by the cell at the completion of the reaction.

9. A titrating and recording apparatus comprising, a cell for containing a solution to be titrated by the continuous addition of a standard solution thereto until the reaction is completed wherein the reaction and changing of the condition of the solution involves a time lag, the cell producing a voltage of values corresponding to the condition of the solution, a burette for continuously adding a standard solution to the cell for changing the condition of the solution in the cell, measuring and recording apparatus including null-point measuring means responsive to the voltage values produced by the cell and having rebalancing means movable in accordance with said voltage values, an advancing chart graduated with respect to the cell solution conditions and the advancing movement of the chart, and recording means operated by the movable rebalancing means of the measuring means for recording on the chart the voltage values and hence the conditions of the solution in the cell, variable speed motor means for advancing the chart and operating the burette in timed relation, a slide wire operated by the rebalancing means of the measuring means in accordance with the direction and speed of movement thereof, and control means including a network having capacitor and resistance means responsive to the first derivative of the speed of operation of the slide wire and hence to the rate of change of the condition of the solution in the cell for controlling the motor means to slow down the advancing movement of the chart and the rate of addition of the standard solution to the solution in the cell as the rate of change of the condition of the solution in the cell increases to accurately record the amount of standard solution added and the completion of the reaction.

10. A titrating and recording apparatus comprising, a cell for containing a solution to be titrated by the continuous addition of a standard solution thereto through the completion of the reaction wherein the reaction and changing of the condition of the solution involves a time lag, the cell producing a maximum rate of voltage change at the point of complete reaction, a burette for continuously adding a standard solution to the cell for changing the condition of the solution in the cell to produce a maximum rate of voltage change by the cell upon completion of the reaction, measuring and recording apparatus including null-point measuring means responsive to the voltage values produced by the cell and having rebalancing means movable in accordance therewith, an advancing chart graduated with respect to the cell solution conditions and the advancing movement of the chart, and recording means operated by the movable rebalancing means of the measuring means for recording on the chart the voltage conditions and hence the conditions of the solution in the cell, variable speed motor means for advancing the chart and operating the burette in timed relation, a slide wire operated by the rebalancing means of the measuring means in accordance with the direction and speed of movement thereof, and control means including a network having capacitor, rectifier and resistance means responsive to the first derivative of the speed of operation of the slide wire, regardless of the direction of operation thereof, and hence to the rate of change of the condition of the solution in the cell for controlling the motor means to slow down the advancing movement of the chart and the rate of addition of the standard solution to the solution in the cell adjacent the point of complete reaction to accurately record the amount of standard solution added and the voltage change produced by the cell at the completion of the reaction.

11. A titrating and recording apparatus comprising, a cell for containing a solution to be titrated by the continuous addition of a standard solution thereto through the completion of the reaction, the cell producing a maximum rate of voltage change at the point of complete reaction, a burette for continuously adding a standard solution to the cell for changing the condition of the solution in the cell, null-point measuring means including resistance means for applying an input voltage thereto and rebalancing means movable in accordance with the applied input voltage, means controlled by the voltage produced by the cell for producing a current flow in one direction through the resistance means which progressively changes with progressive changes in the voltage produced by the cell, said current flow through said resistance means applying an input voltage to the measuring means corresponding to the condition of the solution in the cell, an advancing chart graduated with respect to the cell solution conditions, and recording means operated by the movable rebalancing means of the measuring means for recording on the chart the condition of the solution in the cell.

12. A titrating and recording apparatus comprising, a cell for containing a solution to be titrated by the continuous addition of a standard solution thereto through the completion of the reaction, the cell producing a maximum rate of voltage change at the point of complete reaction, a burette for continuously adding a standard solution to the cell for changing the condition of the solution in the cell, null-point measuring means including a pair of series connected resistances for applying an input voltage thereto and rebalancing means movable in accordance with the applied input voltage, means controlled by the voltage produced by the cell for producing a current flow in one direction through one of the resistances which progressively changes with progressive changes in the voltage produced by the cell, adjustable means for producing a desired fixed current flow in the other of said resistances, said current flows through said pair of resistances applying an input voltage to the measuring means corresponding to the condition of the solution in the cell, an advancing chart graduated with respect to the cell solution conditions, and recording means operated by the movable rebalancing means of the measuring means for recording on the chart the condition of the solution in the cell.

13. A titrating and recording apparatus comprising, a cell for containing a solution to be titrated by the continous addition of a standard solution thereto through the completion of the reaction wherein the reaction and changing of the condition of the solution involves a time lag, the cell producing a maximum rate of voltage change at the point of complete reaction, a burette for continuously adding a standard solution to the cell for changing the condition of the solution in the cell, null-point measuring means including resistance means for applying an input voltage thereto and rebalancing means movable in accordance with the applied input voltage, means controlled by the voltage produced by the cell for producing a current flow in one direction through the resistance means which progressively changes with progressive changes in the voltage produced by the cell, said current flow through said resistance means applying an input voltage to the measuring means corresponding to the condition of the solution in the cell, an advancing chart graduated with respect to the cell solution conditions and the advancing movement of the chart, and recording means operated by the movable rebalancing means of the measuring means for recording on the chart the condition of the solution in the cell, motor means for advancing the chart and operating the burette in timed relation, and means responsive to the first derivative of the speed of movement of the rebalancing means, regardless of the direction of such movement, and hence the rate of change of the condition of the solution in the cell for controlling the motor means to slow down the advancing movement of the chart and the rate of addition of the standard solution to the solution in the cell adjacent the point of complete reaction to accurately record the amount of standard solution added and the voltage change produced by the cell at the completion of the reaction.

14. A titrating and recording apparatus comprising, a cell for containing a solution to be titrated by the continuous addition of a standard solution thereto through the completion of the reaction wherein the reaction and changing of the condition of the solution involves a time lag, the cell producing a maximum rate of voltage change at the point of complete reaction, a burette for continuously adding a standard solution to the cell for changing the condition of the solution in the cell, null-point measuring means including a pair of series connected resistances for applying an input voltage thereto and rebalancing means movable in accordance with the applied input voltage, means controlled by the voltage produced by the cell for producing a current flow in one direction through one of the resistances which progressively changes with progressive changes in the voltage produced by the cell, adjustable means for producing a desired fixed current flow in the other of said resistances, said current flows through said pair of resistances applying an input voltage to the measuring means corresponding to the condition of the solution in the cell, an advancing chart graduated with respect to the solution conditions and the advancing movement of the chart, and recording means operated by the movable rebalancing means of the measuring means for recording on the chart the condition of the solution in the cell, motor means for advancing the chart and operating the burette in timed relation, and means responsive to the first derivative of the speed of movement of the rebalancing means, regardless of the direction of such movement, and hence the rate of change of the condition of the solution in the cell for controlling the motor means to slow down the advancing movement of the chart and the rate of addition of the standard solution to the solution in the cell adjacent the point of complete reaction to accurately record the amount of standard solution added and the voltage change produced by the cell at the completion of the reaction.

15. A titrating and recording apparatus comprising, a cell for containing a solution to be titrated by the continuous addition of a standard solution thereto through the completion of the reaction wherein the reaction and changing of the condition of the solution involves a time lag, the cell producing a maximum rate of voltage change at the point of complete reaction, a burette for continuously adding a standard solution to the cell for changing the condition of the solution in the cell, null-point measuring means including a pair of series connected resistances for applying an input voltage thereto and rebalancing means movable in accordance with the applied input voltage, means controlled by the voltage produced by the cell for producing a current flow in one direction through one of the resistances which progressively changes with progressive changes in the voltage produced by the cell, adjustable means for producing a desired fixed current flow in the other of said resistances, said current flows through said pair of resistances applying an input voltage to the measuring means corresponding to the condition of the solution in the cell, an advancing chart graduated with respect to the cell solution conditions and the advancing movement of the chart, and recording means operated by the movable rebalancing means of the measuring means for recording on the chart the condition of the solution in the cell, variable speed motor means for advancing the chart and operating the burette in timed relation, a slide wire operated by the rebalancing means of the measuring means in accordance with the direction and speed of movement thereof, and control means including a network having capacitor, rectifier and resistance means responsive to the first derivative of the speed of operation of the slide wire, regardless of the direction of operation thereof, and hence to the rate of change of the condition of the solution in the cell for controlling the motor means to slow down the advancing movement of the chart and the rate of addition of the standard solution to the solution in the cell adjacent the point of complete reaction to accurately record the amount of standard solution added and the voltage change produced by the cell at the completion of the reaction.

References Cited by the Examiner

UNITED STATES PATENTS

| | | | |
|---|---|---|---|
| 2,668,097 | 2/1954 | Hallikainen et al. | 23—253 |
| 2,931,964 | 4/1960 | Dawe et al. | 318—28 |
| 2,950,178 | 8/1960 | Halfter et al. | 23—253 |
| 2,994,590 | 8/1961 | Brems | 23—253 |

OTHER REFERENCES

Malmstadt et al.: An Automatic Differential Potentiometric Titrator. Analytical Chemistry. 26(8): pp. 1348–51, August 1954.

MORRIS O. WOLK, *Primary Examiner.*

JAMES H. TAYMAN, JR., *Examiner.*